Figure 1:
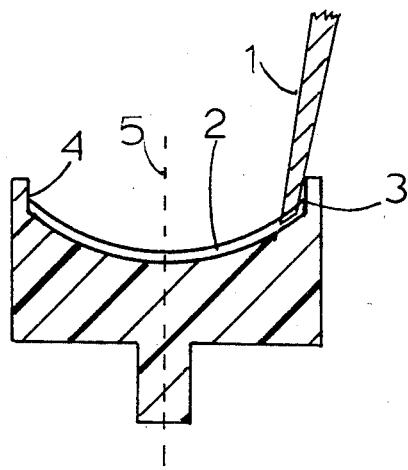

United States Patent [19]

Neefe

[11] Patent Number: 4,590,018
[45] Date of Patent: May 20, 1986

[54] METHOD OF IMPROVING SPIN CAST LENSES

[76] Inventor: Charles W. Neefe, Box 361, Big Spring, Tex. 79721

[21] Appl. No.: 701,029

[22] Filed: Feb. 12, 1985

Related U.S. Application Data

[63] Continuation-in-part of Ser. No. 525,225, Aug. 22, 1983, abandoned, which is a continuation-in-part of Ser. No. 506,873, Jul. 5, 1983, abandoned, which is a continuation-in-part of Ser. No. 417,641, Sep. 13, 1982, Pat. No. 4,416,837.

[51] Int. Cl.$^4$ .............................................. B29D 11/00
[52] U.S. Cl. ..................................... 264/2.1; 264/311; 425/218; 425/426; 425/460; 425/808
[58] Field of Search ................. 264/1.4, 2.1, 2.6, 2.7, 264/310, 311; 65/8; 425/808, 218, 426, 430, 434, 458, 460

[56] References Cited

U.S. PATENT DOCUMENTS 2,880,109  3/1959  Current et al. ..................... 264/311
3,408,429 10/1968  Wichterle ............................ 264/2.1
3,660,545  5/1972  Wichterle ............................ 264/2.1
3,699,089 10/1972  Wichterle ............................ 264/2.1
4,517,139  5/1985  Rawlinge et al. ................... 425/808

FOREIGN PATENT DOCUMENTS 933473  6/1982  U.S.S.R. ............................... 264/2.1

Primary Examiner—James Lowe

[57] ABSTRACT

Spin casting is accomplished by spinning a liquid monomer in a rotating concave mold. Centrifugal force provides the concave lens curvature. Insufficient wetting at the edge of the lens mold results in imperfect lenses. Three methods have been found to increase the wetting. (1) Time: If the rotating monomer is allowed to remain in the mold, some improvement in wetting will occur due to liquid creep. Receding contact angles are lower than advancing contact angles. Two methods have been found to provide receding contact angles. (1) A wiper forces the liquid outward to the edge of the mold. (2) High rotational speed will provide sufficient centrifugal force to move the liquid monomer outward to the edge. Reducing the rotational speed will result in a receding contact angle.

1 Claim, 2 Drawing Figures

METHOD OF IMPROVING SPIN CAST LENSES

This is a continuation-in-part of application Ser. No. 525,225 filed Aug. 22, 1983 entitled; "Simplified Improvements in Spin Casting Prism Lenses", now abandoned, which is a continuation-in-part of application Ser. No. 506,873 filed July 5, 1983 entitled; "Improvements in Spin Casting Hydrogel Lenses" now abandoned which is a continuation-in-part of application Ser. No. 417,641 filed Sept. 13, 1982 entitled; "Simplified Improvements in Spin Casting" now U.S. Pat. No. 4,416,837.

PRIOR ART

The art of spin casting contact lenses has been in use for nineteen years.

Spin casting has proven to be the best process for economically producing large numbers of stock soft contact lenses. The spin cast process provides highly reproducible lenses having controlled parameters.

Spin casting provides a method of incorporating inert non-aqueous, water soluble solvents in the soft lens monomer mixture whereby the lens will shrink in size when hydrated and the solvent removed. This shrinkage is believed to enhance the coiling of the polymer chains and this accounts for the improved toughness, resilience and tear resistance of spin cast lenses. The process also lends itself to rapid ultra-violet curing which provides a predictable molecular structure with few toxic by-products.

The principal value of spin casting is its low cost and high production. Lenses made by spin casting also are most comfortable due to the thin and consistent edge shape provided by spin casting.

The disadvantages are the lenses are not spherical and the aspheric surface is of a shape that increases spherical aberration. This has three disadvantages: (1) The usable optical zone in the center of the lens is reduced requiring the lens to center well. (2) The reduction in visual acuity due to increased spherical aberration effect. (3) Visual acuity will fluxuate with lens movement.

A method has been employed whereby the advantages of spin casting may be employed to produce soft contact lenses having large optical zones with improved optical quality and reduced spherical aberration effect. This method requires a matching aspheric curve on the convex surface to neutralize the optical effects of the aspheric concave surface produced by spin casting.

Spin cast lenses made by this method will have thicker edges due to the peripheral flattening of the convex lens curve and are uncomfortable when placed on the eye unless procedures are used to thin and improve the edge contour.

SUBJECT OF THE INVENTION

Methods have been developed for reducing the excessive lens thickness at the edge. Irregular uneven edges are frequently produced by spin casting. This has been shown to be the result of the monomer not wetting the mold surface evenly out to the edge of the lens mold.

Contact angles are measured on macroscopic, smooth, nonporous, planar substrates by merely placing a droplet of the liquid or solution on the substrate and determining the contact angle by any of a number of techniques. The contact angle can be measured directly by use of a microscope fitted with a goniometer eyepiece or by photographing the droplet. Indirect measurement of the contact angle can be done by measuring the height h and the diameter d of the droplet. However, obtaining a valid, reproducible contact angle is more complicated and difficult than it appears, for a number of reasons:

A solid surface, even when apparently smooth, may have impurities and defects that vary from place to place on the surface and from sample to sample.

In spin casting the contact angle shows hysteresis. In this case the advancing contact angle will always be greater than the receding contact angle, sometimes differing by as much as 60°. Contact angle hysteresis is always present under the conditions required for spin casting.

Other reasons for low receding angles are penetration of the liquid into the substrate, removal of an absorbed surface film from the substrate by the wetting liquid or microscopic surface roughness.

IN THE DRAWINGS

Figure 2:
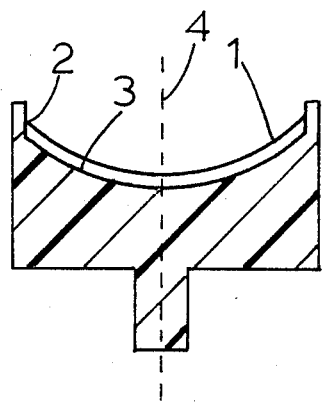

FIG. 1 shows the spin cast lens and wiper in section.
FIG. 2 shows the spin cast lens in the mold in section.

THE LENS IS MADE AS FOLLOWS

The inability of the liquid lens monomer to fully wet the surface of the lens mold produces uneven and irregular edges as well as distortion at the edge of the optical surface. This inability to wet the mold surface is due to contamination or inconsistencies on the mold surface resulting in an equilibrium of forces and uneven edges. Contamination can be in the form of dust particlaes, oxidation, atmospheric moisture absorption, air borne pollutions or variations in the composition of the mold material. The molding conditions, heat, pressure and injection speed also effect the mold surface. The mold area near the entrance gate may have different molecular and surface qualities, this is especially true if a small gate and fast injection speed are used. Under these conditions the shear forces generated at the gate greatly increases the temperature of the resin being injected and temperatures sufficient to depolymerize the resins can easily be reached. Molecular orientation also occurs inside the gate area. It has been found that the lens edges are smooth and undistorted if liquid monomer is first distributed over the entire mold surface. Improved wetting of the mold surface is provided since receding contact angles in areas where the mold has been wet by the monomer are lower than advancing contact angles in areas where the mold has not yet been wet by the monomer. Better wetting may be accomplished by the use of a stationary wiper 1 FIG. 1 which contacts the edge of the rotating liquid and forces the liquid 2 FIG. 1 upward at the edge 3 FIG. 1 and in contact with the circular raised edge of the rotating mold 4 FIG. 1. The mold is rotated around the center of rotation 5 FIG. 1. The wiper 1 FIG. 1 may also be the nozzle or injection tube through which the liquid lens monomer 2 FIG. 1 is metered and introduced into the lens mold 4 FIG. 1.

The even distribution of liquid at the lens edge may also be accomplished by pre-spinning liquid monomer in the lens mold at the speed required to form the concave lens surface having the required refractive power (150 rpm to 500 rpm). The liquid monomer is rotated in the mold at the selected speed for an extended length of time (1 minute to 30 minutes) at the selected speed before polymerization is started to allow wetting of the mold surface by the lens monomer to proceed to its limit.

The time required for mold wetting can be greatly reduced to 2 seconds to 30 seconds by increasing the speed of rotational to a speed 10 percent to 125 percent higher in rpm than required for the desired lens refractive power and above the selected speed at which polymerization will occur. With the reduction of rotational speed and centrifugal force the liquid monomer moves inward and a receding contact angle will be present at the lens edge thus providing faster and improved wetting of the mold surface by the liquid lens monomer. Polymerization of the liquid lens monomer provides a solid lens having a smooth edge.

PREFERRED EMBODIMENT

With increased rotational speed the additional centrifugal force will force the liquid lens monomer 1 FIG. 2 outward and upward against the raised circular retaining rim 2 FIG. 2 surrounding the concave optical surface 3 FIG. 2. The revolutions per minute around the axis of rotation 4 FIG. 2 are reduced to the speed required to form a lens surface 1 FIG. 2 having the required refractive power. The lens mold surface 3 FIG. 2 is evenly wet by the liquid monomer. A smooth edge and optical surface 1 FIG. 1 is present on the surface of the slower rotating liquid lens. Ultraviolet light, heat, chemical initiator or microwave energy are used to polymerize the smoothly shaped rotating liquid lens monomer to form a solid smoothly shaped lens.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of improving the edge shape of spin cast lenses by the steps of providing a concave spin casting mold having a circular raised rim surrounding the concave optical mold surface, placing a liquid lens monomer in the spin casting mold, rotating the spin casting mold around its axis of rotation, a solid wiper which is also the injection nozzle tube through which the liquid lens monomer is metered and introduced into the concave spin casting mold is placed in contact with the rotating liquid monomer near the circular raised rim surrounding the concave optical mold surface, allowing the rotating liquid lens monomer to be displaced by the stationary solid wiper and the liquid monomer to move outward against the circular raised rim surrounding the concave optical mold surface, removing the solid wiper from the rotating liquid and allowing the rotating liquid lens monomer to form a smooth surface in contact with the raised rim surrounding the rotating concave optical mold surface, allowing the rotating liquid lens monomer to polymerize to form a solid lens having an improved edge shape.

* * * * *